United States Patent

Bernet

[11] Patent Number: 5,722,164
[45] Date of Patent: Mar. 3, 1998

[54] METHOD FOR MANUFACTURING GEARING COMPONENTS WITH SPECIAL GEARING, ESPECIALLY SYNCHROMESH GEARING

[75] Inventor: Alois Bernet, Jona, Switzerland

[73] Assignee: Feinstanz AG, Rapperswil, Switzerland

[21] Appl. No.: 618,555

[22] Filed: Mar. 20, 1996

[30] Foreign Application Priority Data

Apr. 10, 1995 [CH] Switzerland ............... 01027/95

[51] Int. Cl.$^6$ .......................................... B21D 53/28
[52] U.S. Cl. .................. 29/893.33; 29/893.3; 29/893.36; 72/377; 192/114 T
[58] Field of Search .................. 29/893.3, 893.35, 29/893.33, 893.34, 893.36; 72/377; 192/114 T

[56] References Cited

U.S. PATENT DOCUMENTS 2,843,927  7/1958  Stock ........................ 29/893.34
4,866,831  9/1989  Lanzerath et al. .............. 29/893

FOREIGN PATENT DOCUMENTS 0 250 312   12/1987  European Pat. Off.
63-120958   5/1988   Japan ........................... 29/893
3-94949     4/1991   Japan.
8600838     2/1986   WIPO ....................... 29/893.35

Primary Examiner—P. W. Echols
Attorney, Agent, or Firm—Spender & Frank

[57] ABSTRACT

The gearing component, in this case a synchronizer ring with synchromesh gearing for automobile gear boxes, is manufactured by cutting it out of a strip of material with a precision cutting machine, at the same time forming gearing out of radial and at least nearly cuboid projections to be stamped into teeth which have a given ratio of tooth height to minimum tooth width. The excess material or flash formed during the stamping operation is removed with a punching tool. The teeth are deburred in a grinding operation, and the edges are rounded off to a certain extent at least. This method not only permits the extremely economical manufacture of such gearing components; a previously unobtainable precision of tooth shape and hardness is also made possible.

4 Claims, 1 Drawing Sheet

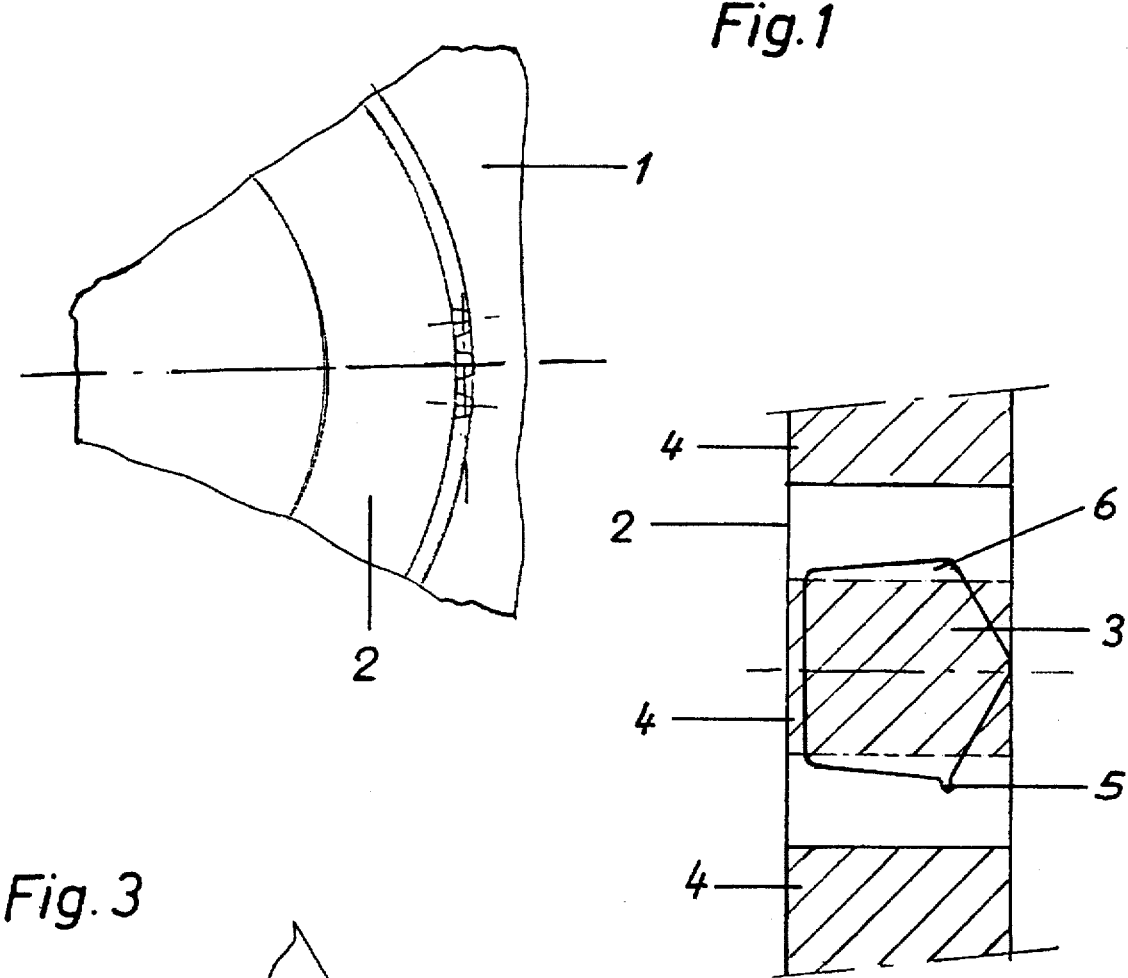
Fig. 1
Fig. 2
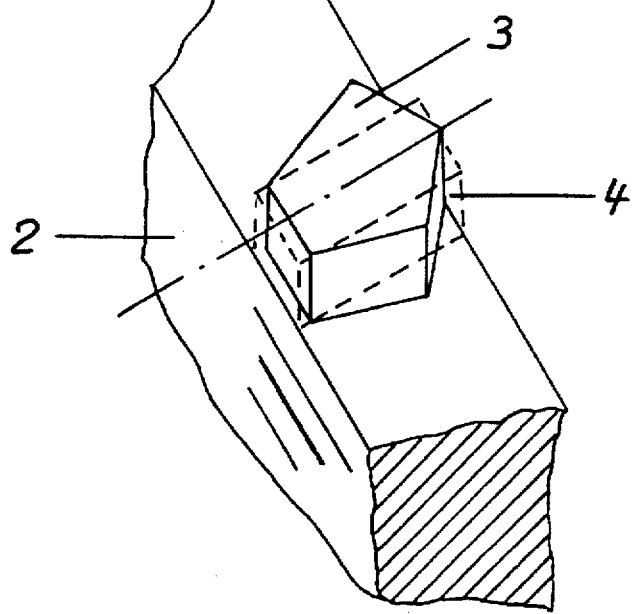
Fig. 3

METHOD FOR MANUFACTURING GEARING COMPONENTS WITH SPECIAL GEARING, ESPECIALLY SYNCHROMESH GEARING

The present invention relates to a method for manufacturing gearing components with special gearing, especially synchromesh gearing such as synchronizer rings or coupling frames, for gear boxes to be used in the automobile industry, etc.

One problem in the manufacture of synchronized gearing is represented by the gearing components with synchromesh gearing which are roof-shaped when seen from a radial view and undercut and are for this reason produced according to a complicated manufacturing technique comprising cutting in several operations, such as broaching and milling.

An additional disadvantage of this kind of gearing is that the tooth surfaces, and especially the tooth faces, machined in the way described above are relatively deeply scored, which results in a relatively large amount of wear during shifting of the gears. Furthermore, disposal of the shavings produced during cutting, which contains oil or emulsion, is costly.

The object of the present invention is to create a method which permits the manufacture of gearing components of the type described above in a much simpler way which are optimized with regard to resistance to wear.

This object is fulfilled according to the invention in that each gearing component is cut out of a strip of material on a precision cutting machine and that the gearing simultaneously formed from radial and at least nearly cuboid projections to be formed into teeth which have a given ratio of tooth height to minimum tooth width, and that the projections are then formed into roof-shaped, undercut teeth in a stamping operation. Then, the excess material or flash can be removed with a punching tool; all teeth are then deburred in a grinding operation and the edges are at least partially rounded off.

These measures can be performed successively or in individual steps, whereby the fact that the techniques employed according to the invention permit an extremely economical manufacturing process will be obvious. In addition, the stamping process results in a hardening of the tooth surface, a high degree of smoothness and shallower grooves. Furthermore, this technique permits a relatively high amount of precision with regard to roof shape, which can be symmetrical or asymmetrical, in relation to the middle of the tooth. Gears with rounded edges can be shifted faster, at the same time producing less noise and saving energy.

With these measures, not only can gearing components with special gearing, such as synchronizer rings or coupling frames for gear boxes to be used in the automobile industry, etc., be manufactured extremely economically, a previously unobtainable precision of tooth shape and tooth hardness can also be achieved.

Furthermore, the present invention relates to a gearing component with special gearing, especially synchromesh gearing such as synchronizer rings or coupling frames for gear boxes to be used in the automobile industry, etc., which is produced in a process according to the invention.

An example of an embodiment of the invention is shown in the drawings below, which provide the following:

FIG. 1 Details of an overhead view of a strip of material for the purpose of demonstrating how gearing components in the form of synchronizer rings, etc. can be cut out on a precision cutting machine; and FIG. 2 and 3 An overhead view in a larger scale for the purpose of demonstrating that the gearing comprises radial, at least nearly cuboid projections to be stamped into teeth which have a given ratio of tooth height to minimum tooth width, and that the projections are formed into roof-shaped, undercut teeth in a stamping operation.

In FIG. 1, the gearing component 2, in this case in the form of a synchronizer ring for an automobile gear box which is not depicted, is first cut out of a strip of material 1 on a precision cutting machine which is also not depicted. This synchronizer ring is cut in the form of radial gearing from at least nearly cuboid projections 4 to be shaped into the teeth 3 which have the height of the teeth and the minimum tooth width, as shown in detail in FIG. 2 and 3.

These projections 4 are then formed into the roof-shaped, undercut teeth 3 in a stamping operation.

Thereafter, the excess material 5 resulting from the stamping and forming process is removed with a punching tool (shown at one spot in FIG. 2).

Thereafter, the teeth 3 are deburred in a grinding operation, and the edges 6 are rounded off to a certain extent at least.

These measures can be performed successively or in individual steps.

The method according to the invention can be used for the extremely economical manufacture of gearing components of the type described above. The tooth surface is hardened in the stamping operation, producing a high degree of smoothness and extremely shallow grooves. Furthermore, a roof shape can be produced with relatively high degree of precision. In addition, the rounded edges allow gear boxes with this kind of gear to be shifted faster, at the same time producing less noise and saving energy.

Protection of the following type is requested:

I claim:

1. A method of making a toothed gear comprising the steps of (a) cutting, from a strip of material, a gear blank including circumferentially spaced, radially extending, substantially cuboid projections having a given ratio of tooth height to minimum tooth width; and (b) forming the projections, by stamping, into roof-shaped, undercut teeth.

2. The method as defined in claim 1, further comprising the step of removing, by punching, excess material resulting from step (b).

3. The method as defined in claim 2, further comprising the step of grinding the teeth subsequent to the punching step.

4. The method as defined in claim 2, further comprising the step of rounding edges of the teeth.

* * * * *